(12) United States Patent
Paufler

(10) Patent No.: US 11,188,122 B2
(45) Date of Patent: Nov. 30, 2021

(54) LOW-PROFILE WEARABLE SCANNING DEVICE

(71) Applicant: Datalogic USA Inc., Eugene, OR (US)

(72) Inventor: David Paufler, Eugene, OR (US)

(73) Assignee: Datalogic USA Inc., Eugene, OR (US)

(*) Notice: Subject to any disclaimer, the term of this patent is extended or adjusted under 35 U.S.C. 154(b) by 0 days.

(21) Appl. No.: 15/851,530

(22) Filed: Dec. 21, 2017

(65) Prior Publication Data
US 2019/0196535 A1    Jun. 27, 2019

(51) Int. Cl.
| | |
|---|---|
| G06F 1/16 | (2006.01) |
| G06K 7/10 | (2006.01) |
| H04B 1/3827 | (2015.01) |
| G06F 3/01 | (2006.01) |
| G06F 3/0346 | (2013.01) |

(52) U.S. Cl.
CPC .............. *G06F 1/163* (2013.01); *G06F 3/014* (2013.01); *G06F 3/0346* (2013.01); *G06K 7/10584* (2013.01); *G06K 7/10891* (2013.01); *H04B 1/385* (2013.01); *G06F 2203/0331* (2013.01); *H04B 2001/3861* (2013.01)

(58) Field of Classification Search
CPC ................ G06F 1/163; G06K 7/10584; G06K 7/10891; H04B 1/385
See application file for complete search history.

(56) References Cited

U.S. PATENT DOCUMENTS

| | | | |
|---|---|---|---|
| 5,191,197 A * | 3/1993 | Metlitsky | G06K 7/10564 235/462.44 |
| 5,305,181 A | 4/1994 | Schultz | |
| 5,514,861 A * | 5/1996 | Swartz | G06F 1/163 235/462.44 |

(Continued)

FOREIGN PATENT DOCUMENTS

WO    2017164727 A1    9/2017

OTHER PUBLICATIONS

WT41N0, Product Spec Sheet, Zebra, www.zebra.com/wt41n0, printed Dec. 21, 2017, 2 pages.

(Continued)

*Primary Examiner* — James Wu
*Assistant Examiner* — Christopher L Augustin
(74) *Attorney, Agent, or Firm* — Foley & Lardner LLP

(57) ABSTRACT

A code reader may include a housing configured to be wearable by a user, a scanning unit configured to scan machine-readable indicia of a target area, a user interface connected to the housing and configured to present identification data associated with the machine-readable indicia to the user, a power source disposed within the housing, a processing unit disposed within the housing, and a plurality of electrical conductors in electrical communication with the processing unit and the user interface. The processing unit may be configured to communicate a scan signal to the scanning unit to cause the scanning unit to scan the target area, receive response data from the scanning unit represen- (Continued)

tative of the machine-readable indicia, generate the identification data in response to receiving the response data, and communicate the identification data to the user interface for display thereon. The electrical conductors may provide power and enable signals to be communicated.

19 Claims, 8 Drawing Sheets

(56) References Cited

U.S. PATENT DOCUMENTS

| | | | | |
|---|---|---|---|---|
| 5,657,201 | A * | 8/1997 | Kochis | G06F 1/163 |
| | | | | 224/219 |
| 5,856,660 | A * | 1/1999 | Bard | G06F 1/163 |
| | | | | 235/455 |
| 6,108,197 | A | 8/2000 | Janik | |
| 6,285,757 | B1 | 9/2001 | Carroll et al. | |
| 6,528,203 | B1 | 3/2003 | Mitamura | |
| 6,595,420 | B1 * | 7/2003 | Wilz, Sr. | B82Y 15/00 |
| | | | | 235/462.01 |
| 6,688,526 | B2 | 2/2004 | Metlitsky et al. | |
| 6,696,986 | B1 * | 2/2004 | Harrison, Jr. | G06F 1/163 |
| | | | | 224/219 |
| 7,837,112 | B2 * | 11/2010 | An | G06K 7/10891 |
| | | | | 235/462.44 |
| 8,371,506 | B2 * | 2/2013 | Lee | G06K 7/10891 |
| | | | | 235/462.3 |
| 8,725,842 | B1 * | 5/2014 | Al-Nasser | G04G 17/08 |
| | | | | 709/219 |
| 9,747,015 | B2 | 8/2017 | Forutanpour et al. | |
| 10,356,229 | B2 * | 7/2019 | Xia | G06F 1/1652 |
| 2002/0092913 | A1 * | 7/2002 | Bard | G04B 37/0016 |
| | | | | 235/472.02 |
| 2007/0279852 | A1 * | 12/2007 | Daniel | A44C 5/0007 |
| | | | | 361/679.03 |
| 2008/0097724 | A1 * | 4/2008 | Morris | G06F 1/163 |
| | | | | 702/187 |
| 2008/0223890 | A1 * | 9/2008 | Tecchiolli | G06F 1/163 |
| | | | | 224/267 |
| 2014/0239065 | A1 * | 8/2014 | Zhou | G06F 1/163 |
| | | | | 235/380 |
| 2014/0249944 | A1 * | 9/2014 | Hicks | G06K 7/10891 |
| | | | | 705/17 |
| 2014/0337621 | A1 * | 11/2014 | Nakhimov | G06F 1/163 |
| | | | | 713/168 |
| 2015/0309535 | A1 * | 10/2015 | Connor | G06F 1/163 |
| | | | | 361/679.03 |
| 2016/0241688 | A1 | 8/2016 | Vossoughi et al. | |
| 2016/0349790 | A1 * | 12/2016 | Connor | G06F 1/1694 |
| 2018/0167549 | A1 * | 6/2018 | Lim | H04N 5/23216 |

OTHER PUBLICATIONS

ProGlove, www.proglove.de/product/technology, printed Dec. 21, 2017, 4 pages.
Armband for iPhone 8 Plus—Cell Phone Wristband for Running, www.amazon.com/sports-forearm-armband-iphone-galaxy/dp/B01269Q88A, printed Dec. 21, 2017, 7 pages.
KDC Wearable Barcode Scanner Accessories, www.koamtac.com/dkc-accessories/kdc-wearable-barcode-scanner-accessories, printed Dec. 21, 2017, 5 pages.
Opticon introduces the RS-2006 Bluetooth Ring Scanner, www.opticon.com/news/opticon-introduces-the-rs-2006-bluetooth-ring-scanner, printed Dec. 21, 2017, 2 pages.

* cited by examiner

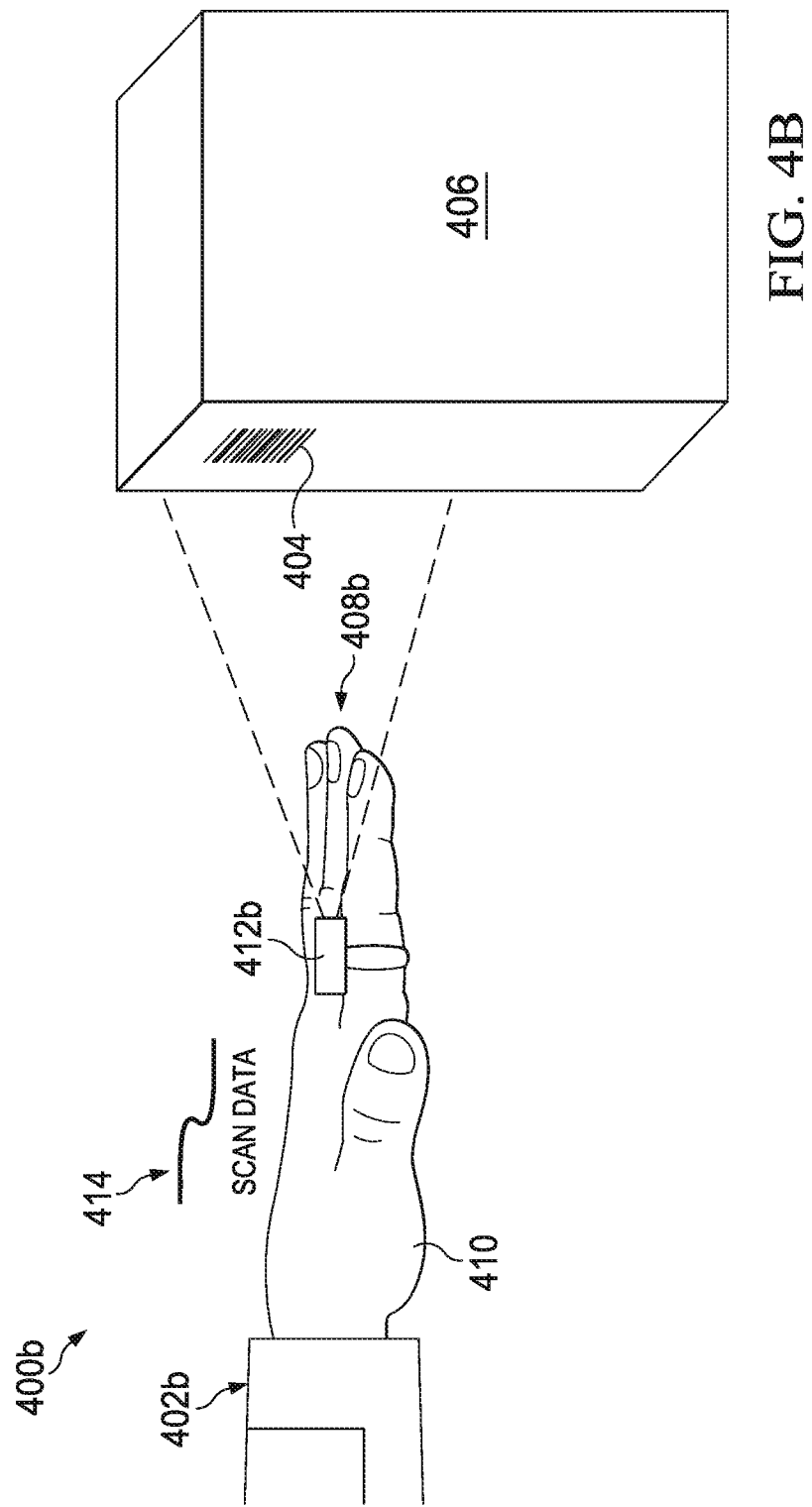

LOW-PROFILE WEARABLE SCANNING DEVICE

FIELD OF THE INVENTION

The present invention relates to barcode readers, and more specifically, to wearable barcode readers.

BACKGROUND OF THE INVENTION

Barcode readers are used in a variety of ways. Barcode readers are physically configured for different uses. For example, checkout counters at points-of-sale have barcode readers that are configured to be used to scan barcodes on consumer goods, and are often fixed position and/or are handheld. For performing order picking, barcode scanners have historically be handheld in the shape of a gun with a handgrip and trigger for activating the scanner. More recently, barcode scanners have been wearable by a user to ease order picking processes, such as performing order picking in warehouses or retail stores, for example. However, conventional wearable barcode readers are bulky as the readers tend to be inches thick, which often results in the readers getting caught on edges of boxes, shelves, or otherwise. As a result of the thickness and configuration of wearable barcode scanners, the scanners result in a physical hassle to the user, which ultimately results in inefficiency of productivity. Additionally, the weight and cabling of conventional wearable barcode readers are prohibitively cumbersome to the user. As a result of the physical configurations of conventional wearable barcode readers, users tend to refrain from using the barcode readers for extended periods of time due to physical challenges and inefficiencies resulting therefrom.

BRIEF SUMMARY OF THE INVENTION

To overcome the shortcomings of conventional wearable barcode readers that are too bulky, heavy, and cumbersome for users to wear for extended periods of time within industrial or retail environments in performing inventory picking and other tasks, a wearable barcode reader that may be segmented, have a low-profile, be light-weight, and use low-power is provided herein. The wearable barcode reader may have a flexible display and housing segment(s) to provide a user with flexibility of use and comfort when being worn. The segmented barcode reader may have different functional electronics in different segments to support the low-profile. For example, a battery may be in one segment, a flexible, low-power display in another segment, scanning unit optionally in another segment, and processing unit in yet another segment of the wearable barcode reader. A scanning unit may be integrated or separated from the wearable barcode reader.

One embodiment of a code reader may include a housing configured to be wearable by a user and including multiple segments. At least one connector may be configured to connect between at least two of the segments of the housing. A scanning unit may be configured to scan machine-readable indicia of a target area. A user interface may be connected to the housing and be configured to present identification data associated with the machine-readable indicia to the user. A power source may be disposed within the housing. A processing unit may be disposed within the housing, and be configured to communicate a scan signal to the scanning unit to cause the scanning unit to scan the target area. Response data may be received from the scanning unit representative of the machine-readable indicia. The identification data may be generated in response to receiving the response data. The identification data may be to the user interface for display thereon. Multiple electrical conductors may be in electrical communication with the processing unit and the user interface, and be configured to provide power to the processing unit and the user interface, and enable signals to be communicated between the processing unit and said user interface.

A method of manufacturing a wearable code reader may include providing a housing with multiple segments. At least one electronic component may be disposed in the segments. The segments may be connected together by a flexible connector. At least one electronic component may include an electronic display, processing unit, input/output (I/O) unit, battery, and imaging unit. A first electrical communication path may be established between the battery and electronic display, processing unit, and I/O unit. A second electrical communication path may be established between the imaging unit and processing unit.

One embodiment of a method of using a using a wearable barcode reader may include bending a flexible connector connecting a pair of housing segments of the wearable barcode reader. The wearable barcode reader may be moved onto an arm of a user while bending the flexible connector. The wearable barcode reader may be used by the user while being worn on the arm to read machine-readable indicia.

BRIEF DESCRIPTION OF THE DRAWINGS

Illustrative embodiments of the present invention are described in detail below with reference to the attached drawing figures, which are incorporated by reference herein and wherein:

FIGS. 4A-4C are illustrations of an illustrative barcode reader system being wearable, flexible, and low-profile, and configured to read machine-readable indicia utilizing a code reader inclusive of a scanning unit;

DETAILED DESCRIPTION OF THE INVENTION

Figure 1:
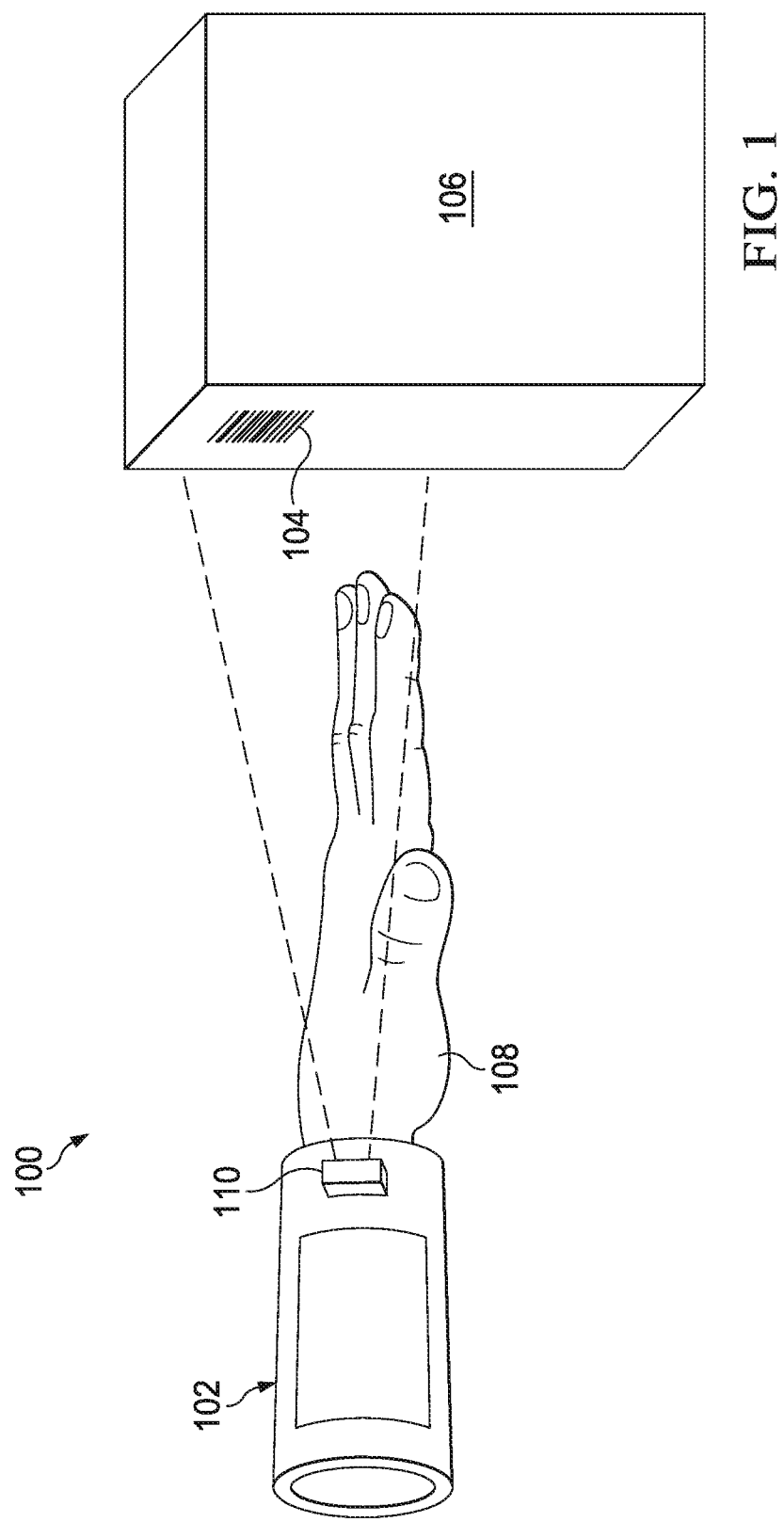
FIG. 1 is an illustration of an illustrative environment in which an illustrative wearable barcode reader system that is segmented, flexible, low-power, and low-profile configured to read machine-readable indicia may be utilized.

With regard to FIG. 1, an illustration of an illustrative environment 100 in which an illustrative barcode reader system 102 may be configured to read machine-readable indicia 104 is shown. The machine-readable indicia 104 is disposed on an item 106, and is representative of a code associated with the item 106. In one embodiment, the wearable code reader 102 is wearable by a user 108, and configured to scan or image the machine-readable indicia 104 using a barcode scanning unit or imager 110. Embodiments of the wearable code reader 102 are described in further detail hereinbelow with regard to FIGS. 2A-7. The use of the barcode reader system 102 that is segmented, flexible, light-weight, and uses low-power provides a user with significantly more comfort and enables higher amounts of use than conventional wearable barcode readers that are bulky and heavier.

As understood in the art, a machine-readable indicia may be any symbol that is representative of a code (e.g., UPC code) associated with an item that enables the code reader to identify the item for conducting order picking, checking out products at a point-of-sale (POS) of a store, performing inventories, or other purpose. A barcode may refer to a conventional barcode, quick reference (QR) code, or any other machine-readable indicia or marking, as understood by one of skill in the art.

Figure 2A:
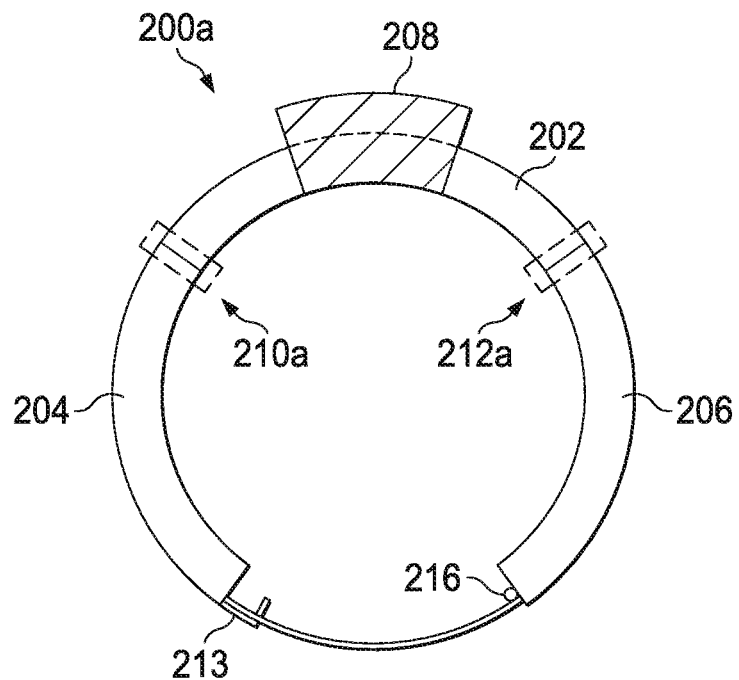
FIGS. 2A and 2B are illustrations of an illustrative barcode reader system being wearable, flexible, and low-profile, and in multiple housing segments with different electronic hardware in the segments with flexible connectors therebetween.
Figure 2B:
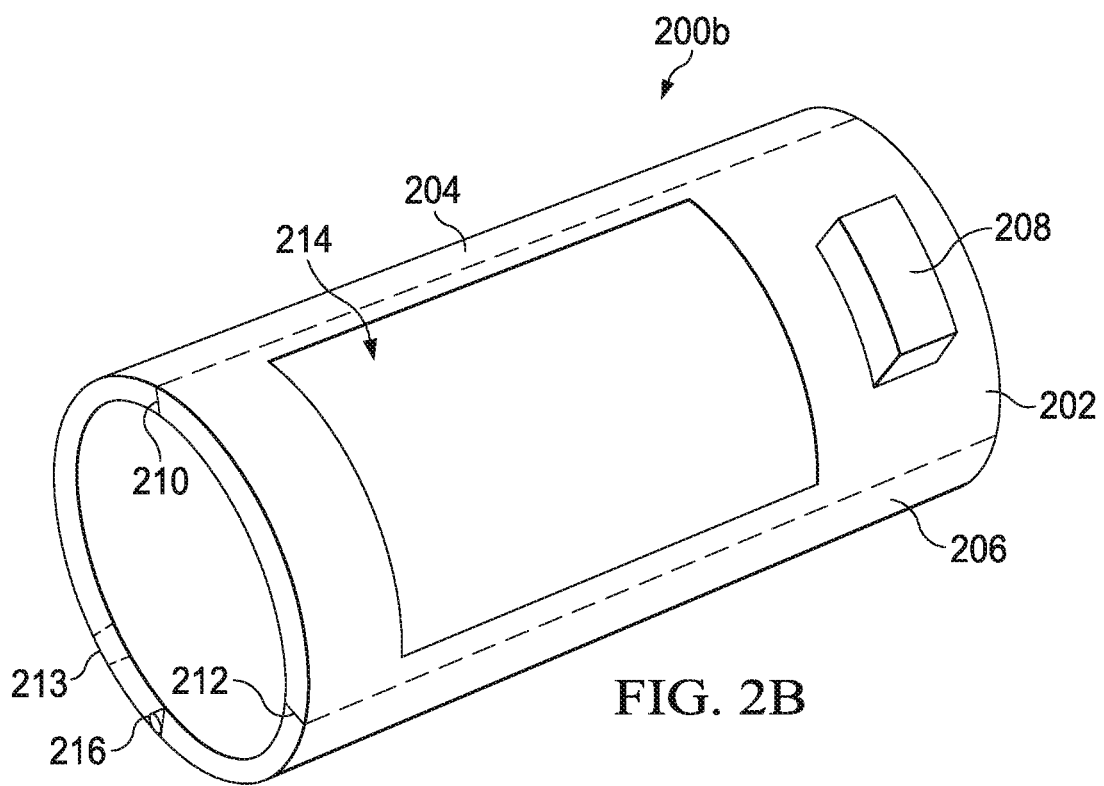

With regard to FIGS. 2A and 2B, illustrations of an illustrative barcode reader system 200a and 200b (collectively 200) being wearable, flexible, and low-profile, and segmented with different hardware in the segments along with flexible connectors therebetween are shown. The segments may be defined by a segmented housing. In one embodiment, the wearable barcode reader system 200 may include a first housing segment 202, a second housing segment 204, and a third housing segment 206. The first housing segment 202 may include a scanning unit 208 for scanning or imaging the machine-readable indicia. The scanning unit 208 may be configured in a separate housing segment, and be directly or indirectly connected to the first housing segment 202a.

The housing segments 202, 204, and 206 of the wearable barcode code reader system 202 may be coupled at flexible joints. In one embodiment, the first housing segment 202 may be coupled to the second housing segment 204 by a first flexible joint 210, and the first housing segment 202 may be coupled to the third housing segment 206 by a second flexible joint 212. One of skill in the art will appreciate that the wearable code reader system 200 may include more or fewer segments and respective flexible joints.

The flexible joints 210, 212 may be configured to enable the housing segments 202, 204, 206 to rotate and/or separate from one another to enable a user to more easily put on and take off the wearable code reader. In an embodiment, the flexible joints 210 and 212 may be fixedly attached to the respective segments 202 and 204, and 202 and 206, and a connector or clasp 213 between the housing segments 204 and 206 may include a hinge 216 that allows a portion of the wearable barcode reader system 200 to open and close around a user's wrist or forearm. In an embodiment, no moving parts may exist, and the joints 210 and 212 along with the housing segments 202, 204, and 206 may enable a user to put on and take off the system 200. A thin connector as shown in FIG. 3C may also be utilized. In one embodiment, the flexible joints 210, 212 may include electrical connectors configured to communicate power and/or signals between the electronics housed by the housing segments 202, 204 and 206.

In one embodiment, the housing segments 202, 204 and 206 may include at least one electrical component. In an embodiment, the first housing segment 202 may include the scanning unit 208 and a user interface 214 for presenting identification data of an item to the user after scanning a barcode associated therewith. In an embodiment, the user interface 214 may include a display, such as a flexible display. In one embodiment, the flexible display may be a flexible electronic paper display or E-unit. The flexible electronic paper display, which may utilize organic light emitting diode (OLED) technology, that utilizes low power to display information thereon. Both flexible electronic paper may OLED displays may be curved, such as with a circular or oval shape. The second segment 204 may include a power source, such as a battery. The third housing segment 206 may include a processing unit. The processing unit may be implemented as one or more central processor unit (CPU) chips, one or more core processor (e.g., a multi-core processor), or may be part of one or more application specific integrated circuit (ASICs) and/or digital signal processor(s) (DSPs). The processing unit may be configured to implement any of the barcode reading processes described herein, and may be implemented using hardware, software, firmware, or combinations thereof.

Figure 3A:
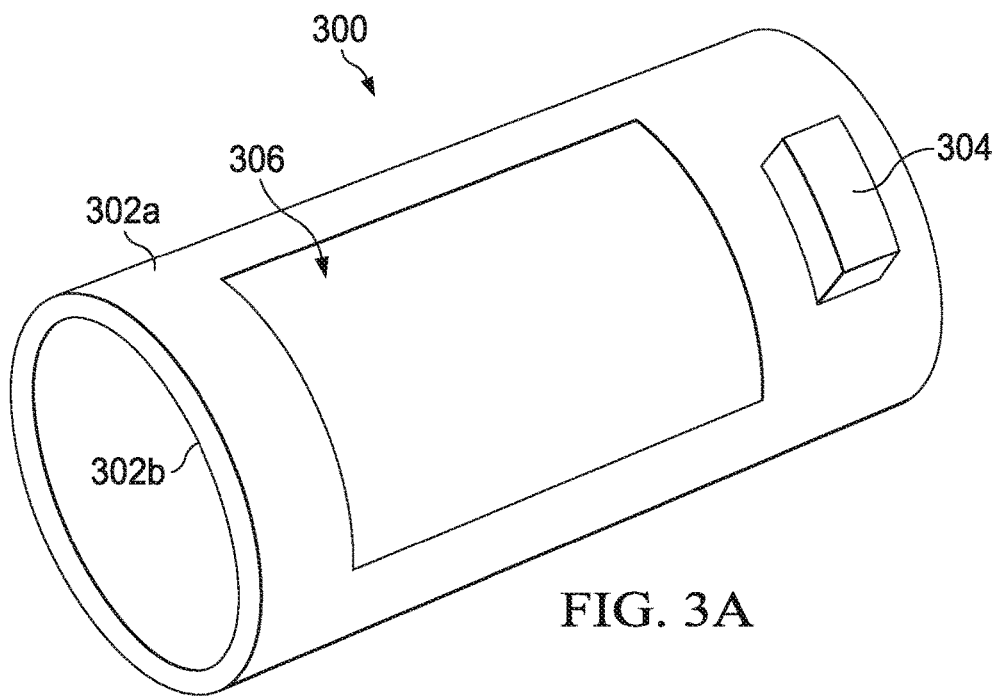
FIGS. 3A and 3B are illustrations of an illustrative barcode reader system configured to read machine-readable indicia utilizing a code reader with segment(s) formed of flexible material.
Figure 3B:
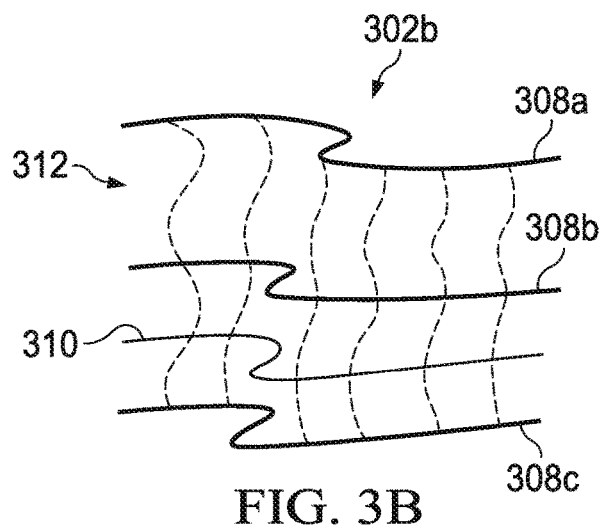
Figure 3C:
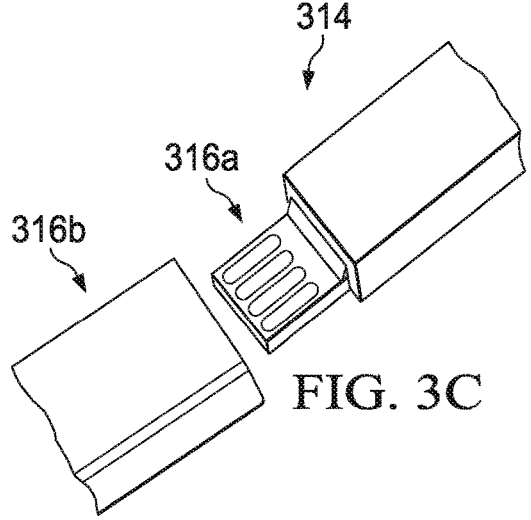
FIG. 3C is an illustration of an illustrative connector that may have a low profile and used to enable electrical power and signals to be communicated between segments of a wearable barcode reader system.

With regard to FIGS. 3A and 3B, illustrations of an illustrative barcode reader system 300 configured to read machine-readable indicia utilizing a code reader, and including structural component(s) that may be composed of flexible material are shown. In an embodiment, the barcode reader system 300 may include a flexible housing portions 302a and 302b (collectively 302) at least partially formed of flexible material, a scanning unit 304, and a user interface 306. In an alternative embodiment, the housing segments may be rigid (i.e., resistant to bending), and flexible connector(s) between the housing segments. The flexible material may include, but is not limited to, polymers, plastics, silicon, rubber, neoprene, textiles, graphene, polyvinyl chloride, and other flexible materials, as understood in the art. The scanning unit 304 may be may include a monochromatic illumination device and/or light or image sensor that may be configured to read machine-readable indicia, as understood in the art. The user interface 306 may be a flexible electronic display that is formed of materials that are bendable or pliable with limited ability to break or crack. That is, the housing and/or electronic display may be easily bent without or breaking during typical usage (e.g., user putting on, taking off, and wearing in a warehouse setting).

In one embodiment, the housing portions 302 may include at least two layers of a non-stretchable material 308a, 308b, 308c (collectively 308) disposed within the housing portion 302b to limit a stretch distance of the flexible housing portion 302b. Electrical conductors 310 may be interposed within the non-stretchable material 308. A flexible and/or elastic material 312 may be interposed between the non-stretchable material 308. In one embodiment, the flexible housing portion 302b may be expanded from a natural state, and the non-stretchable material 308 and electrical conductors 310 may extend up to a maximum expansion length of the non-stretchable material 308, while the flexible and/or elastic material 312, such as rubber, may provide for stretch and/or elasticity up to the maximum length of the non-stretchable material 308.

In one embodiment, the flexible housing portion 302b may be configured to house electrical conductors and/or electrical components, such as, but not limited to, a battery, a processing unit, an electronic display, and electrical connectors. The flexible housing portions 302 may be configured to expand to ease the ability a user to put on and take off the barcode reader system 300 from his or her arm. Additionally, the flexible housing portions 302 may prevent the barcode reader system 300 from falling off the user, and provide a certain amount of resistance to rotation while being worn. Given that arms of users have different circumferences, the flexible housing portions 302 may be reconfigurable to have different inside circumferences and/or be provided with different sizes.

With regard to FIGS. 2A-3B, the barcode reader systems 200, 300 may be configured to have a low-profile and be segmented. In one embodiment, the profile of the housing may be, at most, approximately 1 centimeter. In an embodiment, the low-profile housing may include topological transitions being defined as seamless, edgeless, and cornerless transitions so that the barcode reader system 200, 300 has a low probability of getting caught on other objects while being used by the user. In being seamless, edgeless, and cornerless, the segments may have substantially no thickness differences (e.g., less than about 2 mm), minimal gaps (e.g., less than about 5 mm), and beveled edges and/or rounded corners. In one embodiment, the barcode reader system 200, 300 may include a wearable strap configured to be detachably coupled to the housing 302 of the code reader systems 200, 300.

With regard to FIG. 3C, an illustration of an illustrative connector 314 may include a male connector member 316a and a female connector member 316b is shown. The male connector member 316a may have multiple conductors 318a-318n (collectively 318) that are used to conduct electrical power and/or signals between the different segments, as described with regard to FIGS. 2A and 2B.

Figure 4A:
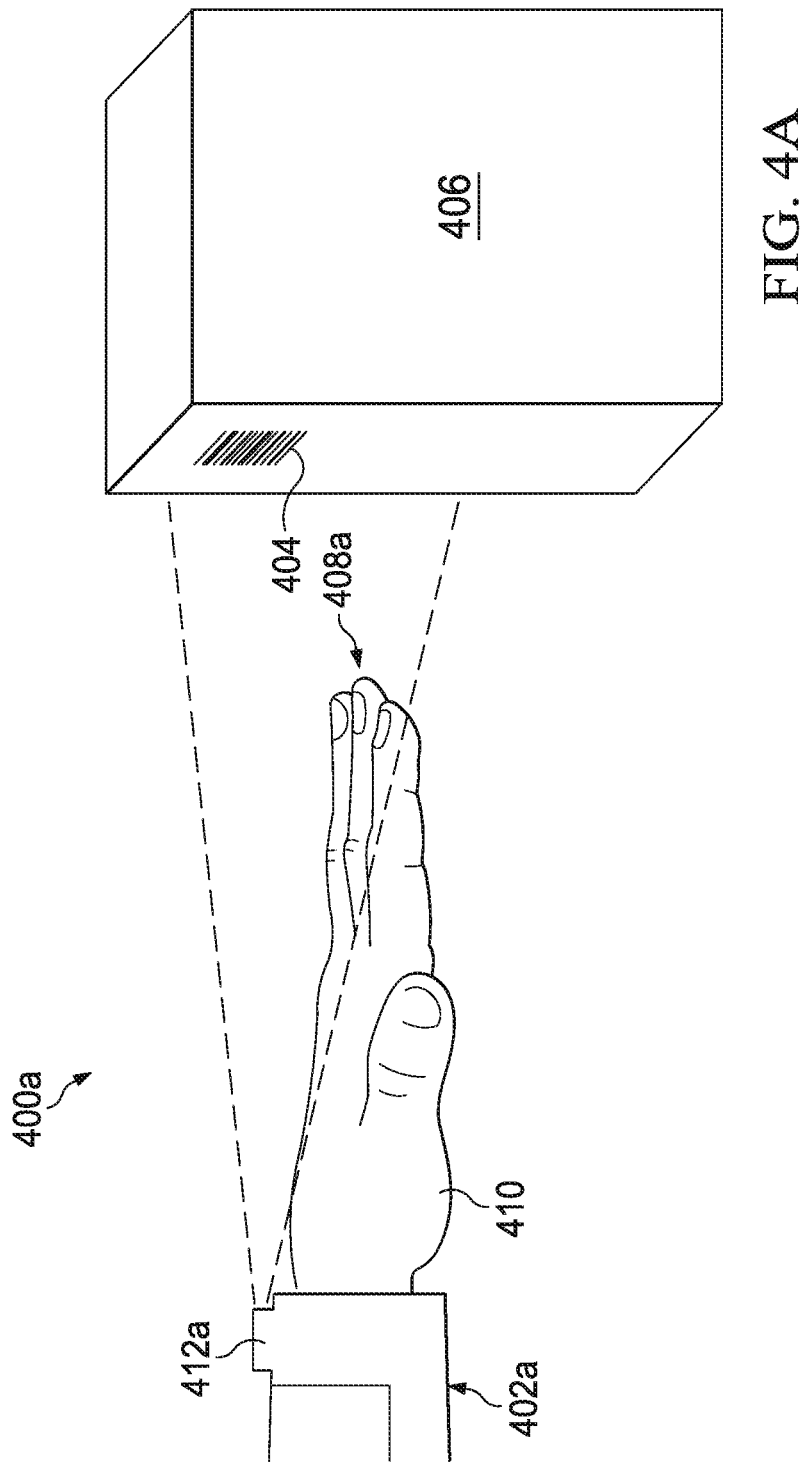
Figure 4C:
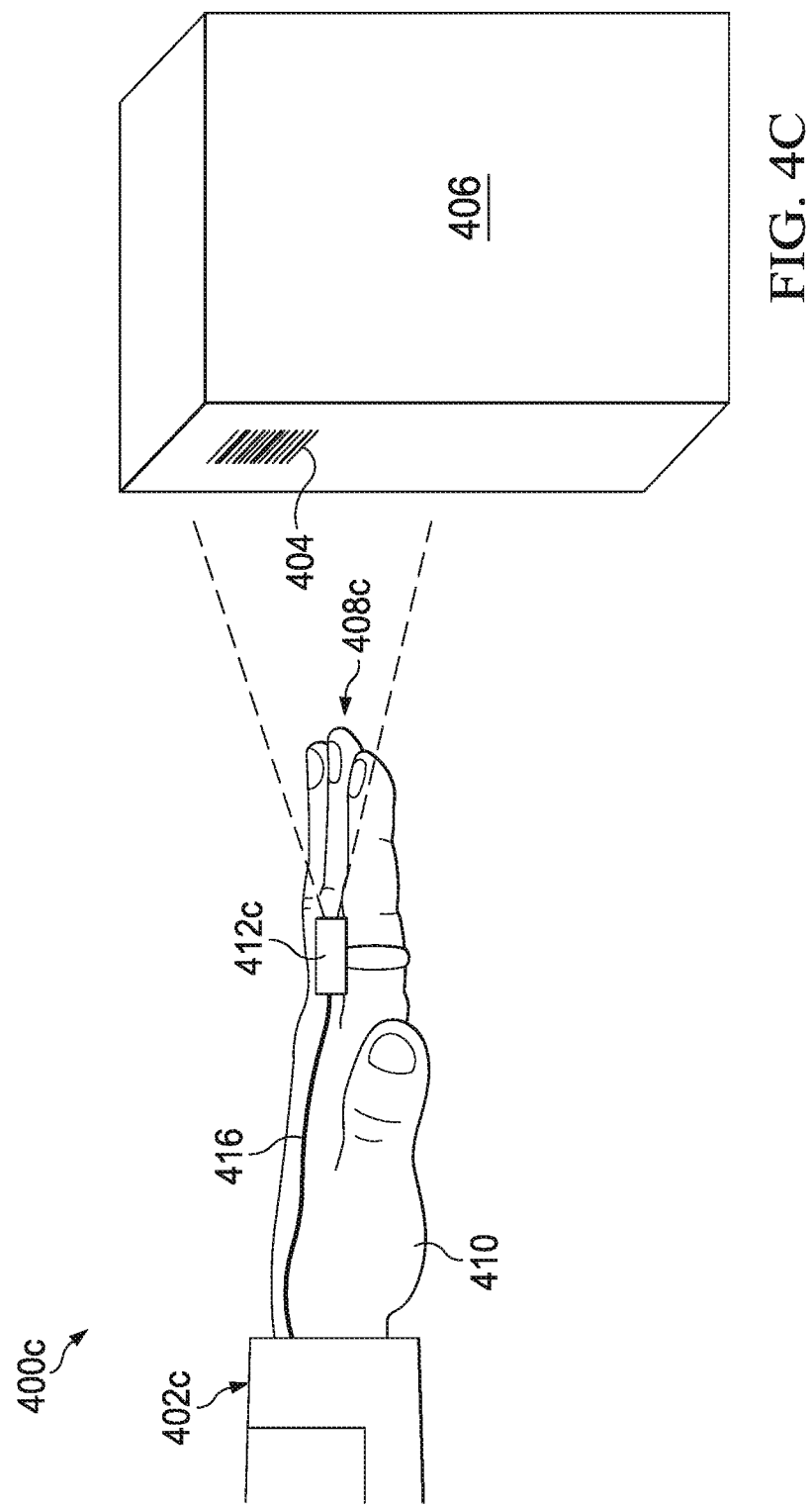

With regard to FIGS. 4A-4C, illustrations of an illustrative environment 400a-400c (collectively 400) in which a wearable barcode reader 402a, 402b, and 402c (collectively 402) that is wearable, flexible, low-power consumable, and low-profile, and configured to read machine-readable indicia 404 positioned on an item or object 406 are shown. The wearable code reader 402 may be worn on an arm of a user 410 to provide for ease-of-use with few or no corners or exposed edges so as to avoid catching objects (e.g., boxes, shelving, etc.) during use by the user 410. The code reader 402 may be configured to scan a target area in a field-of-view 408a-408c (collectively 408), and remain oriented relative to a hand or wrist (i.e., have minimal rotation) of the user 410 during use to maximize efficiency of the user 410. The code reader 402 may include a scanning unit 412a-412c (collectively 412) that is configured to perform scanning or imaging of the machine-readable indicia 404.

In one embodiment, the code reader 402 may be configured to constantly, periodically, or aperiodically scan the target area. In an embodiment, in response to identifying the existence of the machine-readable indicia 404 and/or the item 406 in the field-of-view 408, the scanning unit 412 may automatically scan or image the machine-readable indicia. In an embodiment, the scanning unit 412 may be manually triggered to turn on and/or scan or image a machine-readable indicia. It should be understood that the reader 402 may alternatively and/or additionally be configured to perform object identification by matching images to a match set of objects previously captured.

As shown in FIG. 4A, the scanning unit 412a may disposed within a housing of the wearable code reader 402a. In another embodiment, such as the barcode reader systems 400b and 400c of FIGS. 4B and 4C, the scanning units 412b and 412c may be external to the housing of the wearable code reader 402b and 402c. The scanning units 412 may include optical components and optical sensor(s) for use in scanning and/or capturing images of machine-readable indicia, as understood in the art. In an embodiment, the scanning units 412 may include a processor that converts raw data (e.g., image of barcode) to text to reduce scanning data 414 that is communicated between the scanning units 412 and code reader 402. Alternatively, the scanning units 412 may communicate the raw data captured by the scanning units 412 as the scanning data 414. In FIG. 4B, the scanning unit 412 may be worn on at least one finger of the user 410, such as scanning units 412b and 412c. In one embodiment, the scanning unit 412b may wirelessly communicate scanning data 414 with the wearable code reader 402b. In FIG. 4C, the scanning unit 412c may be configured to be electrically coupled via an electrical conductor 416.

More specifically, the scanning units 412b and 412c external to the wearable code readers 402b and 402c may be configured to communicate a signal representative of the raw scanned machine-readable indicia 404 using a wireless communications protocol (e.g., Bluetooth®) or wireline communications protocol. In another embodiment, the scanning unit 412b and 412c may be configured to process an image of the machine-readable indicia 404 and communicate the converted data as the scanning data 414 associated with the item 406. One of skill in the art will appreciate that scanning and processing may be implemented in a variety of configurations between the scanning unit 412, wearable code reader 402, and other electronic components.

In addition to the configurations and functionalities of the wearable code readers 402, and other code readers presented herein, the code readers 402 may additionally and/or alternatively be configured with other electronic and/or software modules to support other functionality. For example, the code reader(s) 402 may be configured with a camera to enable photographic documentation, microphone for voice directed picking or other voice command activities, dimensioning capabilities to support advanced planning of staging, and/or radio frequency identification (RFID) sensor to support RFID tag sensing and data collection. Other electronic devices and/or software modules that may be executed by a processing unit of the code readers 402 may be provided, as well.

Figure 5:
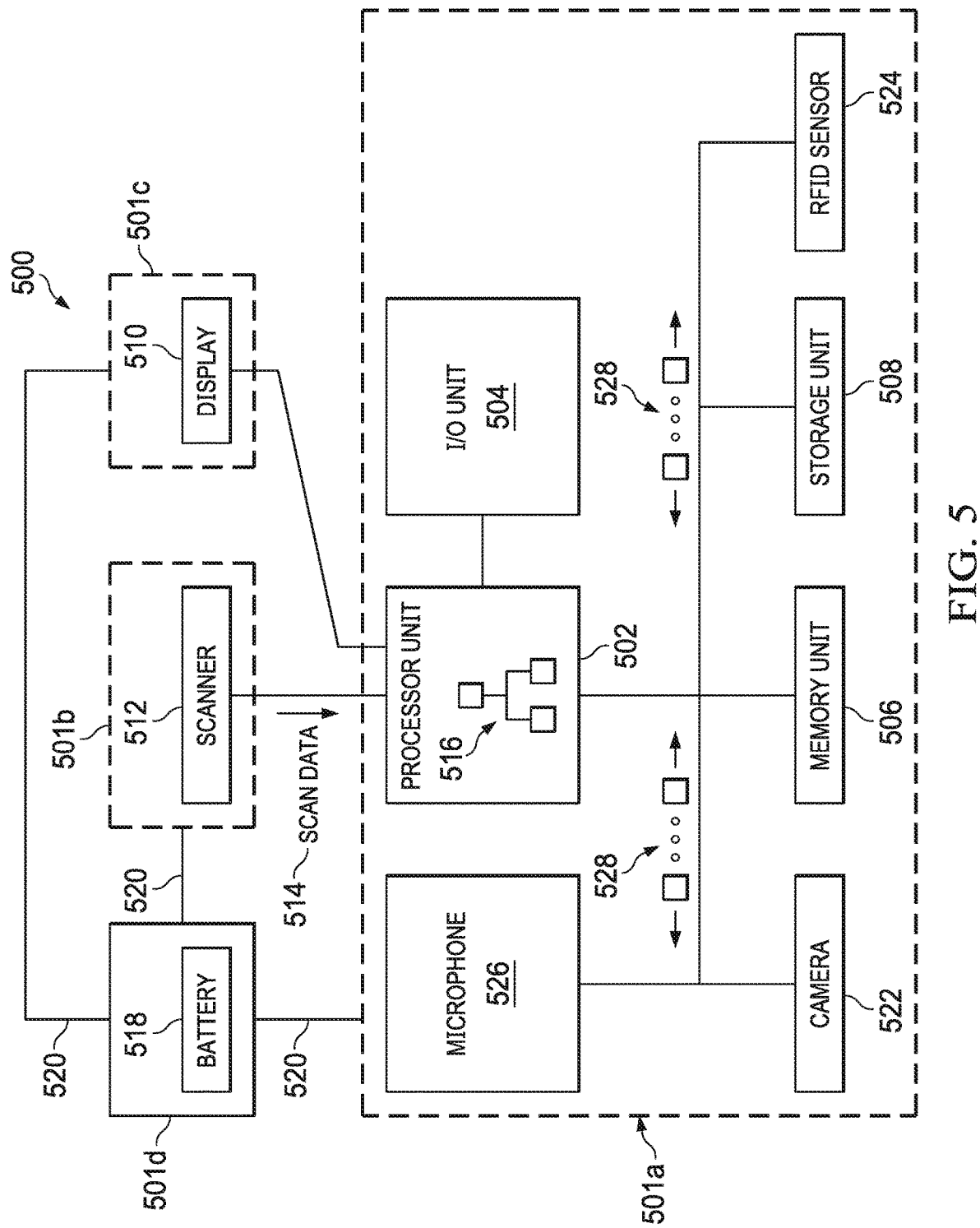
FIG. 5 is a block diagram of illustrative electronic components of the code reader system of any of the previous figures configured to scan and/or read machine-readable indicia.

With regard to FIG. 5, a block diagram of illustrative electronic components 500 of a code reader system, such as the barcode reader system of any of the previous figures, configured to scan and/or read machine-readable indicia and/or to perform object recognition is shown. The electronic components 500 may be included in one or more flexible housing segments 501a-501d (collectively 501), and include a processing unit 502, an input/output (I/O) unit 504 for communicating data, such as image data, a memory unit 506, a storage unit 508, a display 510, and a scanner or scanning unit 512 configured to communicate scan data 514 to the processing unit 502.

The processing unit 502 may include a single processor or multiple processors, including a general purpose processor, signal processor, or any other specialized processor type. The processing unit 502 may further include suitable logic, circuitry, and interfaces that are operable to execute one or more software instructions or modules 516, such as, for example, modules 600 of FIG. 6, to process sensor and other data received to perform operations of a scanner. The processing unit 502 may be realized through a number of processor technologies known in the art. The examples of the processing unit 502 may include, but are not limited to, an x86 processor, an ARM processor, a Reduced Instruction Set Computing (RISC) processor, an Application-Specific Integrated Circuit (ASIC) processor, an image processor, a digital signal processor, or a Complex Instruction Set Computing (CISC) processor. In one embodiment, the processing unit 502 may be disposed on a segmented or curved printed circuit board. In one embodiment, the processing unit 502 may be disposed on a flexible material. The I/O unit 504 may be configured to communicate data over a communications network (e.g., the Internet, wireless communications network, and so on) using any communications protocols, as understood in the art.

In one embodiment, the I/O unit 504 may communicate data (e.g., packets) wirelessly with a communications network through a wireless communications device. In another embodiment, the wireless communications device may be replaced with a wired connection, and the I/O unit 504 may be configured to communicate with a communications network when the code reader system is physically connected with the communications network via an electrical conductor.

The memory unit 506 may include memory devices including, but not limited to, random access memory/volatile storage (RAM) and read only memory/non-volatile storage (ROM). The storage unit 508 may include at least one of one or more solid state drives, disk drives, and/or other memory types. The storage unit 508 may be configured to be used for non-volatile storage of data, such as scanning data and/or identification data, and as an overflow data storage device if RAM is not large enough to hold all working data. The storage unit 508 may be used to store programs (e.g., applications) that are loaded into RAM when such programs are selected for execution. Access to the memory unit 506 may be faster than to the storage unit 508.

The display 510 may be in electrical communication with the processing unit 502. In one embodiment, the display 510 may be configured to display representations of scanned or imaged data to the user. The display 510 may display in color or monochrome, and may be equipped with a touch sensor to enable input by the user via the display 510. The display may utilize low-power during operation, as provided, by electric ink and/or OLED displays.

The scanning unit 512 may be any of the scanning units described herein with reference to FIGS. 1-3C. The scanning unit 512 may include, but not be limited to, a processing unit, one or more sensors, an image sensor, and memory. The scanning unit 512 may communicate the scan data 514 to the processing unit 502 via the I/O unit 504. The scan data 514 may include data corresponding with an scanning data and/or identification data associated with the machine-readable indicia. The scanning data 514 may be configured to capture image data, code represented by the machine-readable indicia, or other data format that may be used or combined with other data by another processor operating on a host system (e.g., POS system), for example, based on a function in which the scanning unit 512 is operating. It should be understood that scanning unit 512 may be internal or external to the housing and that the physical relationship does not contribute to the processes described herein.

A battery 518 may be configured to provide electrical power to each of the other electronic components 500. The battery 518 may be a rechargeable, non-rechargeable, or any other type of battery. The battery 518 may be thin enough to be housed in the low-profile housing, as previously described. For example, the battery 518 may be less than about 2 mm in thickness. In an embodiment, electronics (not shown) that provide for recharging of the battery 518 may be included. The electronics may support wireless recharging. Alternatively, a wired recharging electrical conductor may be provided. A recharging station (not shown), wired and/or wireless, may also be provided with the code reader to enable the user to recharge the battery 518.

The electronic components 500 may be housed in the flexible housing segment(s) 501. The number of housing segments and electronic components 500 stored in the housing segments 501 may vary depending on a desired configuration. In an embodiment, the housing segments 501 may each be flexible such that the user may better able to perform tasks (e.g., order picking) with his or her hand of the arm on which the code reader system is positioned. In an alternative embodiment, the housing segment 501c on which the electronic display 510 is located may be flexible as the electronic display 510 may be flexible, while the other housing segments 501a, 501b, and 501d may be non-flexible or inflexible (i.e., rigid or not easily bent) or less flexible as the housing segments 501a, 501b, and 501d may house less-flexible or inflexible electronics. The housing segment 501c may be configured to support the electronic display 510 so that the user may view and access the display 510 as opposed to containing the electronic display 510 within the housing segment 501c. That is, the housing segment 501c may be configured as a flexible frame to enable the electronic display 510 to be mounted thereto to enable a user to view and operate a user interface displayed on the electronic display 510. As shown, electrical conductor(s) 520 may be configured to supply power and/or data to each of the other electronic components 500. The electrical conductor(s) 520 may extend through or on flexible connectors (e.g., rubber or other material that is easily bent) between each of the housing segments 501, thereby enabling the housing segments 501 to be able to rotate or otherwise be displaced relative to one another during wear by a user.

In an embodiment, a camera 522 may be included in one of the housing segments 501 for use in capturing images. In an alternative embodiment, the camera may be part of or be the scanner 512 that is capable of performing imaging and/or scanning of machine-readable indicia. The camera 522 may capture images to be used by a user to conduct photographic documentation, such as images of products or damaged products that are being selected for order picking, for example. A radio frequency identifier (RFID) sensor 524 may be used to read RFID tags, either active or passive, by a user of the code reader system with the electronic components 500. A microphone 526 may be used to capture audio, such as voice commands, by a user for hands-free control of the code reader system. In operation, the camera 522, RFID sensor 524, and microphone 526 may capture and communicate data 528 in data packets or otherwise to the processing unit 502 for storage and/or processing thereby. The data 528 may also include control data communicated by the processing unit 502 to the sensor(s) 512, 522, 524, and/or 526 for controlling operation (e.g., setting operational parameters) of the different sensors. By including various sensors within the code reader system, a user may minimize the number of devices he or she has to carry in order to perform different functions, and maximize efficiency during operations.

Figure 6:
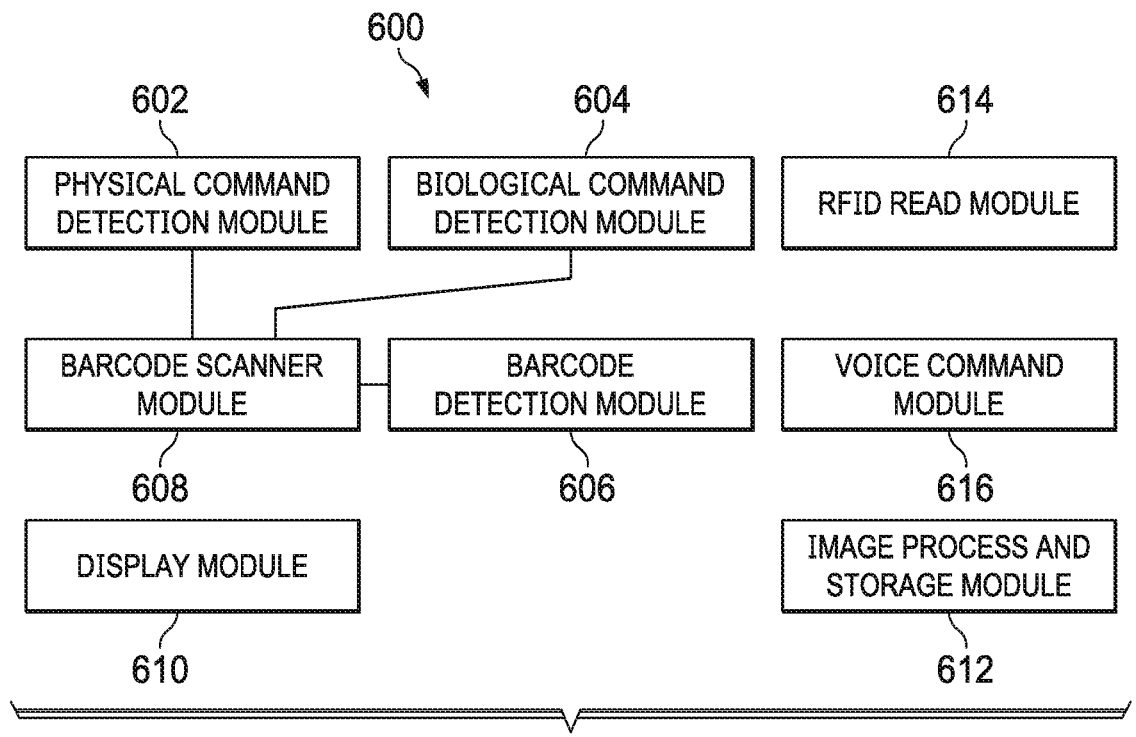
FIG. 6 is a block diagram of illustrative software modules executed by a processing unit of a code reader system configured to read machine-readable indicia.

With regard to FIG. 6, a block diagram of illustrative software modules 600 executed by a processing unit of a code reader system configured to read machine-readable indicia is shown. The modules 600 may include modules for detecting and/or scanning a machine-readable indicia by a variety of processes. For example, a detection module 602 may be configured to determine if a user performs a physical command 602, such as presses a button, that triggers the barcode reader system to perform a scan or capture an image. The button may be a push-button, soft-button displayed on an electronic display, or any other location and in communication therewith.

A detection module 604 may be configured to determine if a biological command is given by a user. For example, the detection module 604 may include gyroscope(s), accelerometer(s), and/or other sensor type. The biological command may be any motion, sound, or image performed by a user. For example, a biological command may be an audible command (e.g., a spoken word, whistle, snap, etc.), particular arm motion (e.g., rotation to particular orientation), or movement of a hand (e.g., moving a hand from within a field-of-view of a scanning unit to outside of the field-of-view of the scanning unit).

A detection module 606 may be configured to automatically detect the presence of an object and/or barcode in the target area. The detection module may use pattern or other recognition algorithm to determine whether a particular type of object is identified or barcode is captured within a field-of-view of the scanning unit. In an embodiment, the detection or other module may be configured to perform position identification of the scanner.

A barcode scanner module 608 may be configured to cause a scanning unit (e.g., device with an image sensor) to scan or capture an image of a target area. In one embodiment, the module 608 may be configured to determine if a machine-readable indicia is within a target area of the scanning unit, and automatically, semi-automatically, or manually scan or capture an image of the machine-readable indicia in the target area. The module 608 may further cause a visual or audible sound to be made to indicate to the user whether a scan was successful or not.

A display module 610 may be configured to enable a user to access captured data, derived data therefrom, and control operation of the barcode reading system. The module 610 may further be configured to present identification data associated with an item inclusive of the machine-readable indicia to the user. The module 610 may receive data from the module 608, and display or otherwise use the data for user notification or processing thereby.

In operation, a processing unit may (i) receive an image of a machine-readable indicia from the barcode scanner module 608 and (ii) process the image using a barcode reader module that may be incorporated into the module 608 or separate therefrom to determine the code of the machine-readable indicia representative of the item. The processing unit may be a processing unit of the barcode reader of a scanning unit of the barcode reader. Alternatively, a remote processing unit from the reader may be used to process the data and communicate information associated with the processed data to the reader for display thereon.

The modules 600 may further include an image process and storage module 612 that is configured to capture, process, and/or store images captured by the camera 522 and/or scanner 512 of FIG. 5. In processing the images, the module 612 may be configured to perform pattern and/or image recognition so as to be able to identify products without barcodes by shape, size, and/or markings on the products. In an embodiment, the pattern and/or image recognition may be trained using a training set of images, as understood in the art, and a set of images may be stored for use in comparison during operations (e.g., order picking). The module 612 may also be configured to perform dimensioning of items. In another embodiment, the dimensioning may utilize dimensions of known items or enable a user to place an object (e.g., ruler) with known dimensions in order to enable the module 612 to determine dimensions of other objects.

An RFID read module 614 may be configured to read RFID tags to determine identifiers associated with products in an environment in which RFID tags are associated with products (e.g., consumer goods, parcels, shipping containers) or locations (e.g., doorway, location within a warehouse or retail store, etc.). The use of RFID tags may expedite and/or provide additional information (e.g., tracking location) for a user.

A voice command module 616 may be configured to enable a user to control the code reader without having to contact a display of the code reader. The voice command module 616 may be preprogrammed to allow a user to perform certain operations. Alternatively, the voice command module 616 may enable freeform voice queries and commands. The module 616 may generate commands that may be communicated to other modules to control operation, such as turning on and off features of the code reader or cause the code reader to perform certain functions (e.g., display all products read for a particular fulfillment order).

Figure 7:
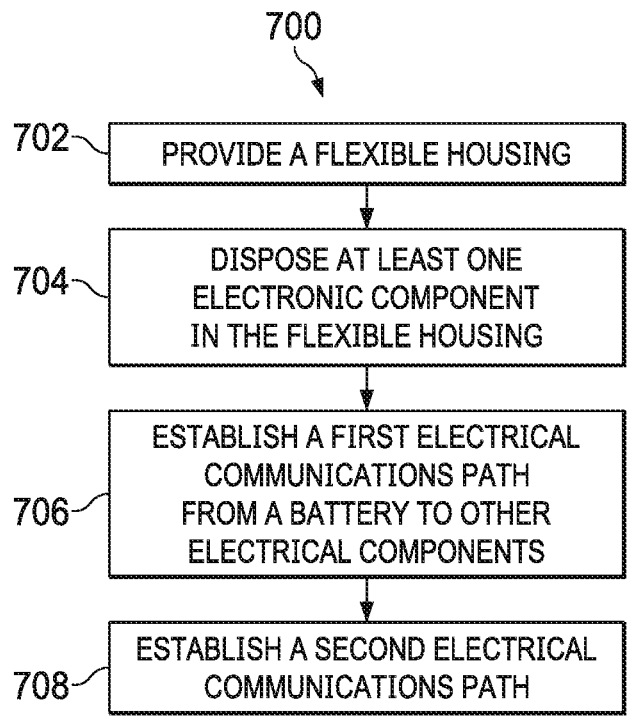
FIG. 7 is a block diagram of an illustrative method of manufacturing a wearable code reader.

With regard to FIG. 7, a block diagram of an illustrative process 700 of manufacturing a wearable code reader 700 is shown. The process 700 may start at step 702, where a flexible housing is provided. The flexible housing (i.e., a housing that is easily bent without breaking) may be entirely flexible or have a portion be flexible, and be configured to be wearable. The flexibility may enable a user to wear the housing directly on his or her skin or over a sleeve of a shirt or jacket. In an embodiment, a portion of the housing that may be flexible may house or otherwise support a flexible electronic display. At step 704, at least one electronic component may be disposed within the flexible housing. For example, an electronic component may include a flexible screen. The flexible screen may be an OLED screen. Additionally and/or alternatively, the flexible screen may be an electronic ink screen. Other electronics, such as processing unit, battery (rechargeable or non-rechargeable), imaging unit (e.g., illumination device with image sensor), or otherwise may be included in a flexible or non-flexible housing.

The housing may be defined by multiple segments, where one or more of the segments are flexible and one or more of the segments are non-flexible. In an embodiment, between flexible and non-flexible or non-flexible and non-flexible segments, flexible connectors with electrical conductors may be used to enable the segments to move relative to one another, thereby providing additional flexibility and comfort. The housing may be low-profile (e.g., less than about 2 cm).

At step 706, a first electrical communications path from a battery may be established. The electrical communication path may include one or more conductors over which power and/or signals may be communicated to power electronic devices, such as an image sensor and processing unit. Signals that may be used to control the battery or provide battery status information to a processing unit may also be communicated over the first electrical communications path.

At step 708, a second electrical communications path may be established. In establishing the second electrical communications path, one or more electrical conductors that extend between multiple segments may be established to enable signals, such as captured image signals, to be communicated between or among segments. In an embodiment, the first and second electrical communications path may be formed of a signal electrical bus. Alternatively, different electrical buses may be established. In establishing the first and second electrical communications paths, the paths may be formed by connectors, such as flexible connectors, that are used to interconnect each of the segments to one another.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

What is claimed:

1. A code reader, comprising:
    a housing configured to be wearable by a user and including a plurality of segments including at least a first segment, a second segment, and a third segment arranged to be worn around a user's wrist, the segments having a radial dimension that is shorter than an axial dimension such that the segments extend along a forearm of the user and coupled at flexible joints configured to separate the segments from one another;
    a scanning unit configured to scan machine-readable indicia of a target area, wherein the scanning unit is disposed within one of the segments of the housing and configured to scan via a side of the respective segment of the housing positioned closest toward a hand of the user when the code reader is being worn on a wrist of the user;
    a user interface connected to the first segment of the housing and configured to present identification data associated with the machine-readable indicia to the user, the user interface having a radial dimension that is shorter than an axial dimension and less than or equal to the axial dimension of the first segment such that the user interface extends along the forearm of the user;
    a power source disposed within the second segment of the housing;
    a processing unit disposed within the third segment of the housing and configured to:
        communicate a scan signal to the scanning unit to cause the scanning unit to scan the target area;
        receive response data from the scanning unit representative of the machine-readable indicia;
        generate the identification data in response to receiving the response data; and
        communicate the identification data to the user interface for display thereon; and
    wherein the flexible joints include:
        a first flexible joint coupling the first segment of the housing and the second segment of the housing and providing at least one electrical connector configured to conduct power from the power source in the second segment to the scanning unit, the user interface, and the processing unit via a first path when the segments are connected; and
        a second flexible joint coupling the first segment of the housing and the third segment of the housing and providing at least one electrical connector configured to communicate communication signals between the processing unit in the third segment and the scanning unit and the user interface via a second path when the segments are connected.

2. The code reader according to claim 1, wherein the segments of the housing are non-flexible rigid materials resistant to bending, and wherein the flexible joints, when connecting adjacent segments, enable the respective non-flexible segments to move relative to one another while enabling electrical connection between the non-flexible segments.

3. The code reader according to claim 2, wherein the low-profile housing includes topological transitions defined by seamless, edgeless, and cornerless transitions.

4. The code reader according to claim 1, wherein the housing further comprises a connecting mechanism configured to connect when the user is wearing the code reader in order to prevent the code reader from falling off the user.

5. The code reader according to claim 1, wherein the user interface includes a flexible display.

6. The code reader according to claim 5, wherein the flexible display is an electronic paper display.

7. The code reader according to claim 1, further comprising an electrical component disposed within one of the segments of the housing, and configured to identify orientation of the code reader.

8. The code reader according to claim 1, wherein the processing unit is further configured to wirelessly communicate the identification data to a communications network.

9. The code reader according to claim 1, wherein the scanning unit is further connected to the first segment of the housing along with the user interface.

10. The code reader according to claim 1, wherein the flexible joints include a flexible material selected from the group consisting of polymers, plastics, silicon, rubber, neoprene, textiles, graphene, and polyvinyl chloride.

11. The code reader according to claim 1, wherein the processing unit is configured to execute a detection module for detecting and scanning a machine readable indicia with the scanning unit.

12. The code reader according to claim 11, wherein the detection module is configured to trigger the scanning unit to perform a scan or imager capture responsive to a manual input.

13. The code reader according to claim 11, wherein the detection module is configured to trigger the scanning unit to perform a scan or imager capture responsive to a biological command.

14. The code reader according to claim 13, wherein the biological command is an audible command.

15. The code reader according to claim 13, wherein the biological command is a hand motion detected by the scanning unit when the hand of the user is within a field of view of the scanning unit.

16. The code reader according to claim 1, wherein the first segment, the second segment, and the third segment have thicknesses that are substantially the same within a tolerance of about 2 mm.

17. The code reader according to claim 16, wherein the thickness of each of the first segment, the second segment, and the third segment is about 2 cm.

18. The code reader according to claim 2, wherein the flexible joints are further configured to rotate the non-flexible rigid segments relative to each other when connected.

19. The code reader according to claim 1, further comprising a clasp connecting the second segment and the third segment and configured to open and close around the user's wrist or forearm.

* * * * *